(12) United States Patent
Scaletti et al.

(10) Patent No.: US 10,014,690 B2
(45) Date of Patent: Jul. 3, 2018

(54) DOUBLE-STAGE INVERTER APPARATUS FOR ENERGY CONVERSION SYSTEMS AND CONTROL METHOD THEREOF

(71) Applicant: ABB TECHNOLOGY AG, Zurich (CH)

(72) Inventors: Silvio Scaletti, Civitella In Val di Chiana (IT); Sauro Macerini, Bucine (IT); Claudio Guarducci, Agliana (IT); Leonardo Canacci, Loro Ciuffenna (IT)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 15/030,795

(22) PCT Filed: Oct. 21, 2013

(86) PCT No.: PCT/IB2013/059515
§ 371 (c)(1),
(2) Date: Apr. 20, 2016

(87) PCT Pub. No.: WO2015/059516
PCT Pub. Date: Apr. 30, 2015

(65) Prior Publication Data
US 2016/0261118 A1 Sep. 8, 2016

(51) Int. Cl.
*H02J 3/38* (2006.01)
*H02M 7/48* (2007.01)
*H02M 7/44* (2006.01)

(52) U.S. Cl.
CPC ............... *H02J 3/385* (2013.01); *H02M 7/44* (2013.01); *H02M 7/48* (2013.01); *Y02E 10/58* (2013.01)

(58) Field of Classification Search
CPC . H02J 3/385; H02M 7/44; H02M 7/48; Y02E 10/58
See application file for complete search history.

(56) References Cited

U.S. PATENT DOCUMENTS

| 8,018,748 | B2 | 9/2011 | Leonard |
| 9,401,665 | B2* | 7/2016 | Yoo .................. H02M 7/53871 |
| 2006/0174939 | A1 | 8/2006 | Matan |
| 2010/0302819 | A1 | 12/2010 | O'Brien |

FOREIGN PATENT DOCUMENTS

EP 1852963 A1 11/2007

* cited by examiner

*Primary Examiner* — Jung Kim
(74) *Attorney, Agent, or Firm* — Abelman, Frayne & Schwab

(57) ABSTRACT

A double-stage inverter apparatus for energy conversion systems (FIG. 1) and control method thereof, adapted to manage the operations of the on-board booster module so as to optimize the overall electrical efficiency of the system. Furthermore, the method according to the present invention allows the operations of said double-stage inverter to be managed when there is only one input channel, when there are multiple input channels called to operate both in parallel and also when there are multiple input channels called to operate independently from each other.

8 Claims, 3 Drawing Sheets

DOUBLE-STAGE INVERTER APPARATUS FOR ENERGY CONVERSION SYSTEMS AND CONTROL METHOD THEREOF

CROSS REFERENCE TO RELATED APPLICATION

This application claims benefit under 35 U.S.C. § 371 to international application No. PCT/IB2013/059515, filed on Oct. 21, 2013, the content of which is incorporated by reference in its entirety.

FIELD OF THE INVENTION

The present invention relates to energy conversion systems, in particular but not exclusively, the present invention relates to conversion systems of the energy generated by photovoltaic panel systems and adapted to be directly connected to the energy distribution network.

STATE OF THE ART

In the technical field of energy conversion and, in particular, in the technical field of systems which convert the energy generated by photovoltaic panel systems and adapted to be directly connected to the energy distribution network, double-stage inverter apparatuses adapted to convert direct voltages originating from photovoltaic systems are of particular importance.

These apparatuses are adapted to receive the input DC voltage originating from photovoltaic generators and to generate an output alternating voltage with a frequency and amplitude compatible with the one of the energy distribution network.

The structure of these apparatuses generally comprises an input stage provided with one or more independent input channels, each connected to separate photovoltaic generators, and an output stage in turn comprising a whole bridge inverter, of the monophase or multiphase type, preferably comprising switches made with active devices such as IGBT, MOSFET, etc.

Said input stage and said output stage are connected by means of an energy storage module, usually indicated with the term DC link, comprising, for example, a plurality of capacitors. Essentially said DC link module consists of the output of the input stage and the input of the output stage of the double-stage inverter apparatus described.

When operating apparatuses of the type described, it is very important to implement the so-called MPPT (Maximum Power Point Tracking) functionality. Photovoltaic panel generators have efficiency values which may be analysed according to the voltage/current curve and depend on a complex and non-linear ratio between the solar radiation which said photovoltaic panels are subjected to, the temperature and total electrical resistance of said panels. The control algorithm which achieves the so-called MPPT functionality disturbs and samples the output of the photovoltaic cells and hence applies the proper electrical load to the photovoltaic cells so as to obtain the maximum power for each different environmental condition.

Within the type of apparatuses described, the input stage is provided with a booster which, when required, acts so as to ensure that the voltage value of the DC link is greater than the minimum level allowed so that the inverter of the output stage may operate properly and connect to the AC voltage distribution network. Furthermore, said booster module is programmed so as to adjust an operating voltage value at the apparatus input (i.e. at the output of the photovoltaic panels) in accordance with the MPPT adjustment algorithm. For example, the voltage value related to the operating point set by the MPPT algorithm ($V_{in}$) is added to a disturbance ($V_{noise}$) required to operate the MPPT algorithm and determines the desired reference value of the total input voltage ($V_{intot}=V_{in}+V_{noise}$) as described in PCT International Applications No. WO2007072517 and WO2010079517 of the same applicant as the present patent application, to which reference is made for further details on calculating said disturbance $V_{noise}$.

It is apparent that the presence, within the double-stage inverter apparatus, of said booster module results in a decrease in overall performance when said booster module is operating. Thus it is desirable that the booster module is switched off every time the presence and operation thereof is not required, i.e. when the optimal value of Vin (the voltage to be set at the input) calculated by the MPPT algorithm is greater than the minimum operating voltage of the DC link required for the proper operation of the inverter stage, and that such a voltage is simply brought back to the DC link by means of, for example, a specific bypass diode 18. When there are several independent input channels, reference is simply made for this functionality to the highest of the input voltages calculated by the various MPPT associated with just as many independent input channels.

Essentially, the control of the apparatus should operate as follows: when the voltage at the apparatus input—plus a given hysteresis value—exceeds said optimal operating voltage value set by the control system, the booster is switched off to later be switched on again when the total voltage at the apparatus input decreases below said optimal operating voltage value, less a given hysteresis value.

Thus, an object of the present invention is to introduce a double-stage inverter apparatus for energy conversion systems and control method thereof, adapted to manage the operations of the on-board booster module so as to optimize the overall electrical efficiency of the system. Furthermore, the method according to the present invention allows the operations of said double-stage inverter to be managed when there is only one input channel, when there are multiple input channels called to operate both in parallel and also when there are multiple input channels called to operate independently from each other.

The present invention may be applied by introducing the same benefits, both when there are monophase systems and when there are multiphase systems.

SUMMARY OF THE INVENTION

Figure 1:
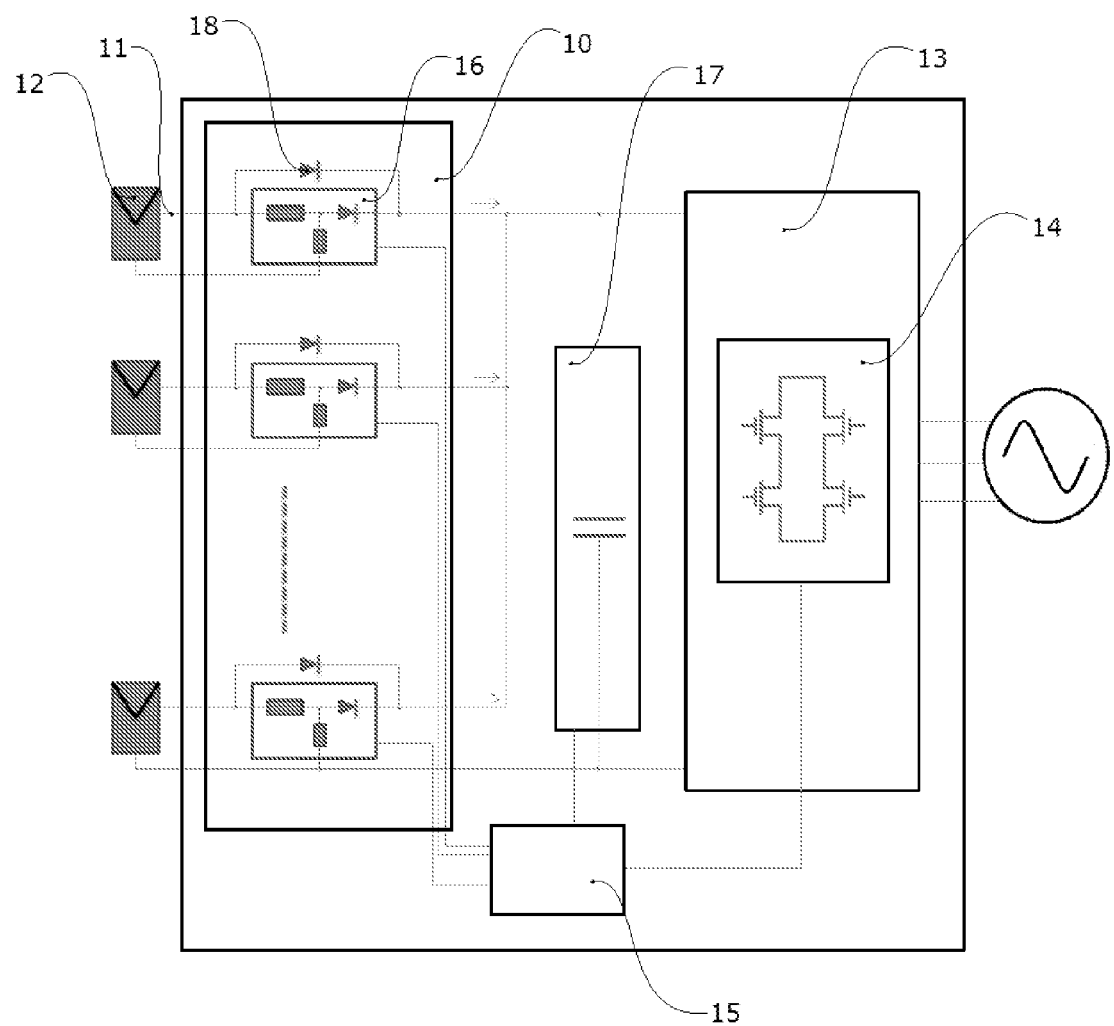
FIG. 1 shows a block operating diagram of the apparatus according to the present invention.

Double-stage inverter apparatus for energy conversion systems and control method thereof, adapted to manage the operations of the on-board booster module so as to optimize the overall electrical efficiency of the system.

Furthermore, the method according to the present invention allows the operations of said double-stage inverter to be managed when there is only one input channel, when there are multiple input channels called to operate both in parallel and also when there are multiple input channels called to operate independently from each other.

DETAILED DESCRIPTION OF THE INVENTION

The double-stage inverter apparatus for energy conversion systems according to the present invention comprises an input stage 10 provided with one or more independent input channels 11, each connected to separate photovoltaic generators 12, an output stage 13 in turn comprising an inverter module 14, preferably of the whole bridge type, of the monophase or multiphase type, preferably comprising switches made with active devices such as IGBT, MOSFET, etc., and a control module 15 adapted to adjust the operation of the apparatus according to the user settings and to the conditions of the inputs and of the output of said apparatus.

Said input stage 10 and said output stage 13 are connected by means of an energy storage module 17, usually indicated with the term DC link, comprising, for example, a plurality of capacitors 17. Said DC link module 17 in essence forms the output of the input stage 10 and the input of the output stage 13 of said inverter. Said input stage 10 comprises at least one booster module 16, one for each independent input channel 11 present, adapted to ensure that the voltage value of said energy storage module 17 (DC link) is greater than the minimum level allowed so that inverter 14 of the output stage 13 may operate properly according to the requirements of the AC voltage distribution network with which said inverter 14 is associated. Furthermore, said at least one booster module 16 acts so as to set an optimal operating voltage value at the apparatus input (i.e. at the output of said photovoltaic generators 12) in accordance with the MPPT adjustment algorithm, which is present for all independent input channels 11, implemented in said control module 15.

The control method according to the present invention allows said control module 15 to manage the operations of said at least one booster module 16 so as to optimize the overall electrical efficiency of the system, while keeping said at least one booster module 16 operating only when it is essential for the proper operation of the apparatus.

Firstly, said control method provides setting the reference values for the control loops of the various sections of the apparatus according to the present invention. The minimum input voltage ($V_{bulkmin}$) required by said inverter module 14 depends on the peak of the AC voltage network with which said inverter module 14 is associated, increased by a coefficient k which considers the intrinsic loses of the switchover devices and of the modulation techniques used and, according to that, is opportunely calculated. Value $V_{bulkmin}$ is an operating reference value, tied with the operating conditions of the apparatus, and is employed to calculate and set other reference values which are employed by the method according to the present invention.

Starting from the $V_{bulkmin}$ value, it is calculated the value of the reference voltage for said inverter module 14, $V_{bulkRefInverter}$, by setting it equal to the value of $V_{bulkmin}$ increased by a quantity $V_{delta1} \geq 0$:

$$V_{bulkRefInverter} = V_{bulkmin} + V_{delta1}.$$

The similar reference value for the booster module 16 ($V_{bulkRefboost}$) is set at a greater value with respect to the similar reference voltage value for said inverter module 14 ($V_{bulkRefInverter}$), so as not to have interactions concerning the adjustment of the voltage of said DC link, between the related control loops.

$V_{bulkRefboost} = V_{bulkRefInverter} + V_{delta2} = V_{bulkmin} + V_{delta1} + V_{delta2}$, in which also $V_{delta2} \geq 0$. Then the actual reference value is calculated of the total input voltage for said inverter module $14_{intot} = V_{in} + V_{noise}$ where $V_{in}$ is the input voltage reference value with the greatest value of all the input voltage reference values calculated by the various MPPT algorithms related to the various input channels present and operating, and where $V_{noise}$ which, as mentioned, depicts an operating disturbance set within said MPPT algorithm required for the operation thereof, according to that described, for example, in PCT International Applications No. WO2007072517 and WO2010079517, of the same applicant as the present patent application.

In essence, during the operation of the apparatus according to the present invention, all the input channels 11 which are operating independently have their own MPPT which continuously adjusts and operates so as to set an operating point thereof, i.e. a reference voltage value considered to be ideal for the photovoltaic generator to which it is connected; said reference voltage values are continuously updated and generally may change during the operation of the apparatus to compensate for any variations of the operating conditions.

At all instants, the highest of such reference values is a candidate for becoming the new reference value for the converter downstream, i.e. for said inverter module 14, $V_{intot}$, calculated, for example, as explained above.

The control method according to the present invention hence singles out three cases: 1) single input channel, 2) multiple input channels and operating in parallel, 3) multiple input channels and operating independently from each other. The control method according to the present invention sets two additional threshold values:

A first threshold, related to the switching off of the booster module 16, equal to the reference voltage $V_{bulkRefBoost}$ plus a first hysteresis value $\Delta 1$ and such that said booster module 16 is switched off when the total reference voltage value $V_{intot}$ exceeds said first threshold, i.e. when, in brief, condition $V_{intot} > V_{bulkRefboost} + \Delta 1$ occurs.

A second threshold, related to the switching on of the booster module 16, equal to the reference voltage $V_{bulkRefboost}$ minus a second hysteresis value $\Delta 2$, and such that said booster module 16 is switched on when the total input voltage decreases to a lower level with respect to said second threshold, i.e. when condition $V_{intot} < V_{bulkRefboost} - \Delta 2$ occurs.

Generally, said first and second hysteresis value $\Delta 1$ and $\Delta 2$ may be equal or different from each other.

Figure 2:
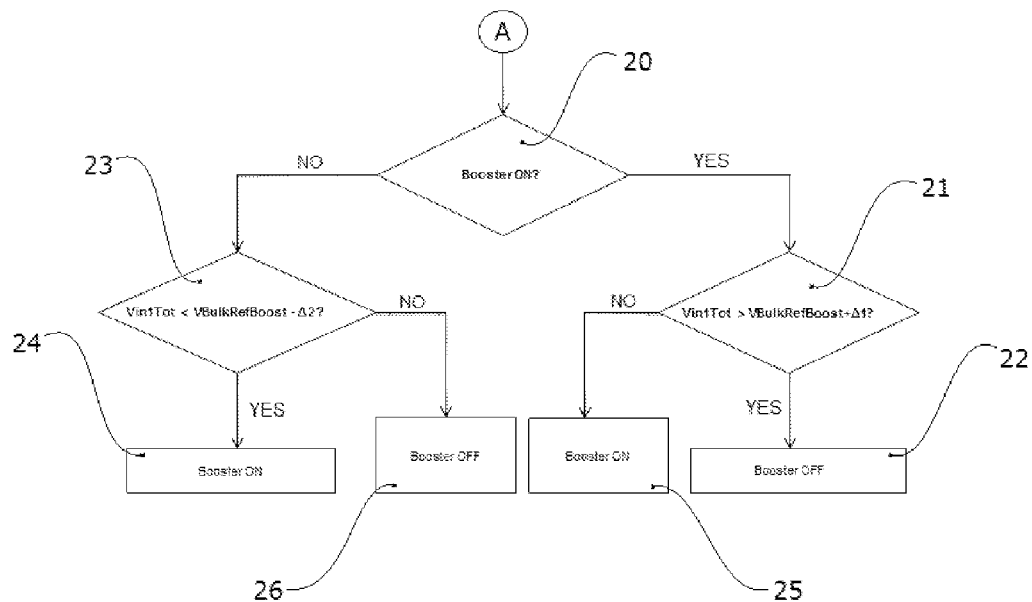
FIG. 2 shows a flow chart of the part of the method according to the present invention, applied when there is a single input channel and when there are multiple input channels and they are operating in parallel.

In greater detail and in reference to accompanying FIG. 2, related to case 1) of the single input channel and to case 2) of multiple input channels in parallel, the method according to the present invention cyclically controls 20 the operating status of said booster module 16.

If said booster module 16 is switched on, the value is checked 21 of the total input voltage $V_{intot}$ with respect to the reference voltage value $V_{bulkRefboost}$, increased by a first hysteresis value $\Delta 1$ and, if it is greater, said booster module 16 is switched off 22, otherwise it is left to operate 25.

When said check 20 establishes that said booster module 16 is switched off at the time, the value is checked 23 of the total input voltage $V_{intot}$ with respect to the reference voltage value $V_{bulkRefBoost}$, minus a second hysteresis value $\Delta 2$; if it is less-than, said booster module 16 is switched on 24, otherwise it is left in the switched off status 26.

Figure 3:
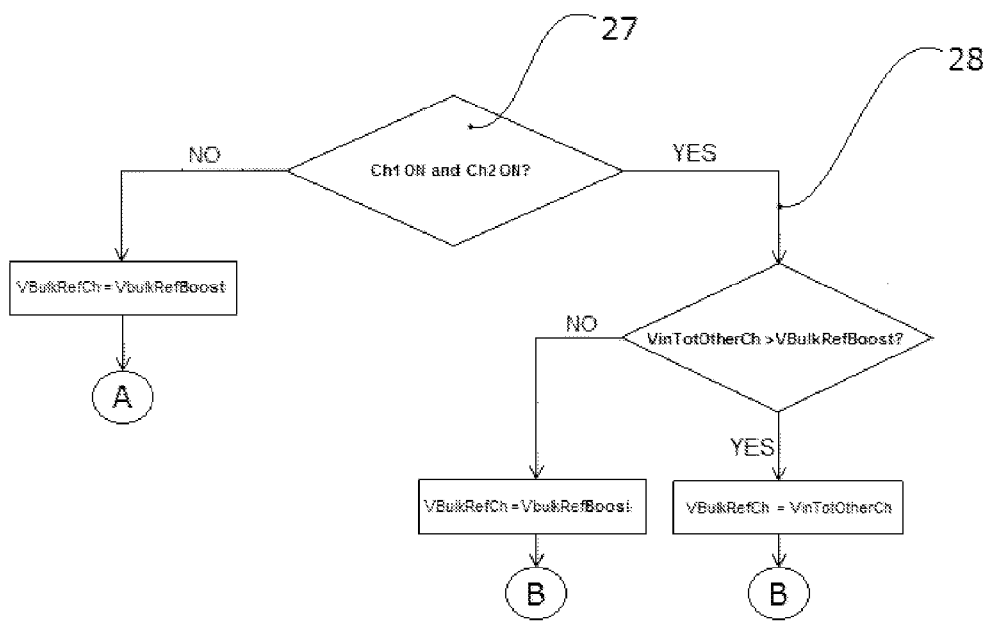
FIG. 3 shows a flow chart of a first part of the method according to the present invention, applied when there are multiple input channels and they are operating independently.

In reference to accompanying FIG. 3, related to case 3) in which multiple and independently operating input channels are present, whether or not the input channels are operating is cyclically checked 27; if only one of said input channels is operating, the method according to the present invention proceeds as in the case of single channel or multiple channels in parallel, described above.

If two or more independent channels are instead operating, all channels will have their reference voltage ($V_{bulkRefChn}$) related to voltage $V_{bulk}$. Said reference voltage $V_{bulkRefChn}$ is set 28 equal to the maximum value of the reference voltage value for the booster value 16 $V_{bulkRefBoost}$, and the maximum total input voltage $V_{intot}$, related to the other channels operating.

Figure 4:
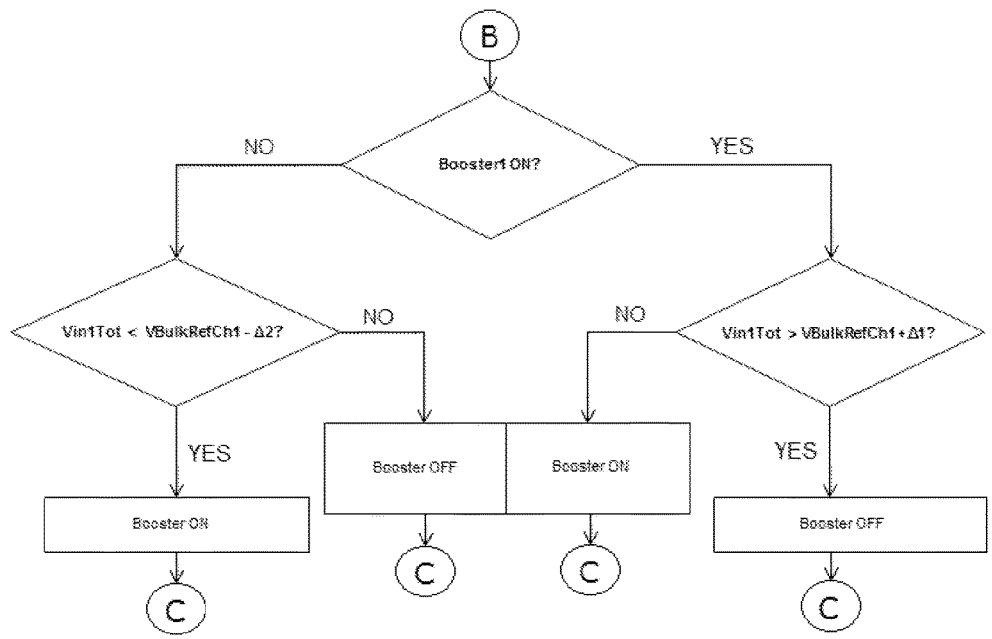
FIG. 4 shows a flow chart of a second part of the method according to the present invention, applied when there are multiple input channels and they are operating independently.
Figure 5:
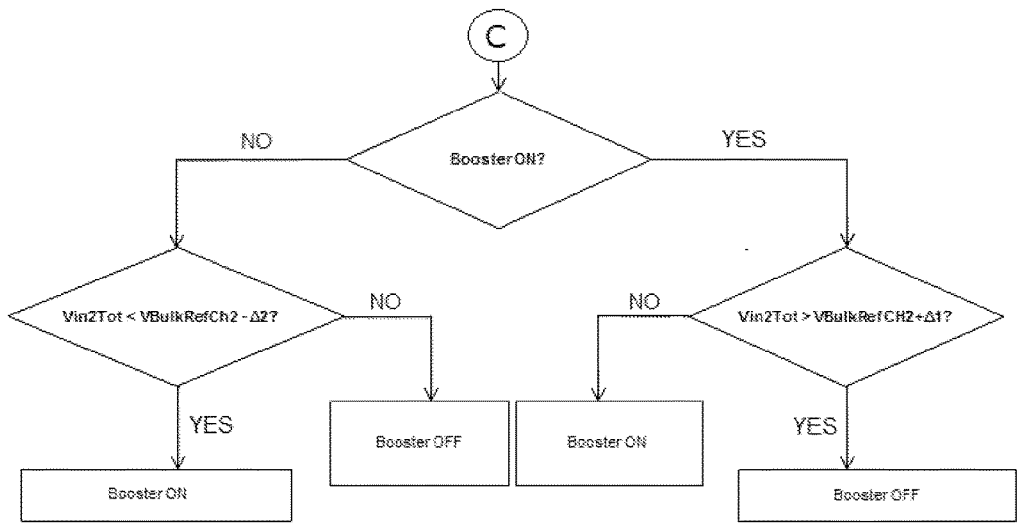
FIG. 5 shows a flow chart of a third part of the method according to the present invention, applied when there are multiple input channels and they are operating independently.

We proceed below as in the case of a single channel or of multiple channels in parallel described above, for each of the channels present, as shown in the flow charts illustrated in accompanying FIGS. 4 and 5.

This results in the channel of the booster module 16 with the highest total input voltage calculated by its own MPPT, $V_{intotmaxabs}$, being switched off if said voltage $V_{intotmaxabs}$, is greater than $V_{bulkRefBoost}+\Delta 1$.

At the same time, said inverter module 14 again sets as its input voltage regulator reference, i.e. of the DC link voltage, the greater of the voltage calculated according to the output voltage $V_{bulkRefInverter}$ and the greater one of all the input voltages $V_{intotmaxabs}$.

Thereby, if one of the booster modules 16 is switched off because its $V_{intot}$ is equal to $V_{intotmaxabs}$, such voltage will be in fact adjusted from then on by the inverter module.

In order to keep the power flow generated by the apparatus according to the present invention as constant as possible, when there are several independent channels operating, the method according to the present invention may further provide to re-synchronize the disturbances $V_{noise}$ related to each input channel present each time said booster module 16 is switched on 24 or switched off 20.

The invention claimed is:

1. A control method for double-stage inverters comprising an input stage provided with a plurality of input channels connected to a plurality of photovoltaic generators in turn connected to a plurality of booster modules; a single output stage in turn comprising a single inverter module, a single energy storage module associated with said input and output stages so as to form the supply and load, respectively, and a control module configured to adjust the operation of said double-stage inverters in a MPPT (Maximum Power Point Tracking) mode, characterized in that said control method comprises the steps of:
   a) calculating the minimum input voltage value $V_{bulkmin}$ required by said inverter module;
   b) selecting a first reference voltage value for said inverter module $V_{bulkRefInverter}$ so that it is greater than or equal to said minimum input voltage value $V_{bulkmin}$;
   c) for each input channel of said plurality of input channels, selecting the reference voltage value for the connected booster module $V_{bulkRefboost}$ so that it is greater than or equal to said first reference voltage value for said inverter module $V_{bulkRefInverter}$;
   d) for each input channel of said plurality of input channels, calculating the reference value for the input voltage of the connected booster module according to the MPPT mode;
   e) selecting the highest $V_{in}$ of the reference values for the input voltage $V_{in}$ of said booster modules calculated in the preceding step;
   f) calculating a second reference voltage value $V_{intot}$ for said inverter module based on the value selected in the preceding step so that said second reference voltage value $V_{intot}$ is greater than or equal to $V_{in}$;
   g) if said booster module is switched on, checking the value of said second reference voltage value $V_{intot}$ with respect to the value of said reference voltage for said booster module $V_{bulkRefboost}$, increased by a first hysteresis value $\Delta 1$ and, if said second reference voltage value $V_{intot}$ is greater, switching off said booster module, otherwise letting it operate; and
   h) if said booster module is switched off, checking the said second reference voltage value $V_{intot}$ with respect to the value of said reference voltage for said booster module $V_{bulkRefboost}$, decreased by a second hysteresis value $\Delta 2$, if said second reference voltage value $V_{intot}$ is smaller, switching on said booster module, otherwise leaving it in the switched off status.

2. The method according to claim 1 comprising the further step of
   j) for each input channel of said plurality of input channels, selecting a reference voltage $V_{bulkRefChn}$ for said booster module equal to the maximum value of the value calculated in preceding step c) $V_{bulkRefBoost}$ and the value calculated in preceding step e) $V_{in}$.

3. The method according to claim 1, wherein said first hysteresis value $\Delta 1$ and said second hysteresis value $\Delta 2$ have the same value.

4. The method according to claim 1, wherein said minimum input voltage $V_{in}$ depends on the peak of an AC voltage network with which said inverter module is associated, increased by a coefficient k.

5. A double-stage inverter apparatus for energy conversion systems comprising an input stage provided with a plurality of input channels connected to a plurality of photovoltaic generators in turn connected to a plurality of booster modules, a single output stage in turn comprising a single inverter module with the output associated with the AC voltage distribution network, a single energy storage module associated with said input and output stages so as to form the supply and load, respectively, and a control module configured to adjust the operation of said apparatus according to the user settings and to the conditions of the inputs and the output of said apparatus and to adjust the operation of said apparatus in a MPPT (Maximum Power Point Tracking) mode, characterized in that said control module is further configured to
   a) calculate the minimum input voltage value $V_{bulkmin}$ required by said inverter module;
   b) select a first reference voltage value for said inverter module $V_{bulkRefInverter}$ so that it is greater than or equal to said minimum input voltage value $V_{bulkmin}$;
   c) for each input channel of said plurality of input channels, selecting the reference voltage value for the connected booster module $V_{bulkRefboost}$ so that it is greater than or equal to said first reference voltage value for said inverter module $V_{bulkRefInverter}$;

d) for each input channel of said plurality of input channels, calculate the reference value for the input voltage of the connected booster module according to the MPPT mode;

e) select the highest $V_{in}$ of the reference values for the input voltage $V_{in}$ of said booster module calculated in the preceding step;

f) calculate a second reference voltage value $V_{intot}$ for said inverter module based on the value selected in the preceding step so that said second reference voltage value $V_{intot}$ is greater than or equal to $V_{in}$;

g) if said booster module is switched on, check the value of said second reference voltage value $V_{intot}$ with respect to the value of said reference voltage for said booster module $V_{bulkRefboost}$, increased by a first hysteresis value Δ1 and, if said second reference voltage value $V_{intot}$ is greater, switch off said booster module, otherwise let it operate; and h) if said booster module is switched off, check the said second reference voltage value $V_{intot}$ with respect to the value of said reference voltage for said booster module $V_{bulkRefboost}$, decreased by a second hysteresis value Δ2; if said second reference voltage value $V_{intot}$ is smaller, switch on said booster module, otherwise leaving it in the switched off status.

6. The double-stage inverter apparatus according to claim 5, wherein said control module is further configured to j) for each input channel of said plurality of input channels, select a reference voltage $V_{bulkRefChn}$ for said booster module equal to the maximum value of the value calculated in preceding step c) $V_{bulkRefBoost}$ and the value calculated in preceding step e) $V_{in}$.

7. The double-stage inverter apparatus according to claim 5, wherein said first hysteresis value Δ1 and said second hysteresis value Δ2 have the same value.

8. The double-stage inverter apparatus according to claim 5, wherein said minimum input voltage $V_{in}$ depends on the peak of an AC voltage network with which said inverter module is associated, increased by a coefficient k.

* * * * *